United States Patent
Rosato et al.

(10) Patent No.: US 9,229,752 B2
(45) Date of Patent: Jan. 5, 2016

(54) SYSTEMS AND METHODS TO OFFLOAD HARDWARE SUPPORT USING A HYPERVISOR SUBPARTITION

(71) Applicant: International Business Machines Corporation, Armonk, NY (US)

(72) Inventors: Matthew J. Rosato, Vestal, NY (US); Steven S. Shultz, Endicott, NY (US); Stephen G. Wilkins, Berkshire, NY (US); Hongjie Yang, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 13/794,879

(22) Filed: Mar. 12, 2013

(65) Prior Publication Data

US 2014/0282498 A1    Sep. 18, 2014

(51) Int. Cl.
*G06F 9/455* (2006.01)
*G06F 9/50* (2006.01)

(52) U.S. Cl.
CPC .......... *G06F 9/45533* (2013.01); *G06F 9/5077* (2013.01); *G06F 2009/45583* (2013.01); *G06F 2209/509* (2013.01)

(58) Field of Classification Search
None
See application file for complete search history.

(56) References Cited

U.S. PATENT DOCUMENTS

| | | | |
|---|---|---|---|
| 7,530,071 B2 | 5/2009 | Billau et al. | |
| 2001/0029550 A1* | 10/2001 | Endo et al. | 709/319 |
| 2007/0050764 A1* | 3/2007 | Traut | 718/1 |
| 2007/0169121 A1* | 7/2007 | Hunt et al. | 718/1 |
| 2008/0008141 A1* | 1/2008 | Tchigevsky et al. | 370/338 |
| 2011/0167472 A1 | 7/2011 | Evans et al. | |
| 2012/0096206 A1* | 4/2012 | Talamacki et al. | 710/263 |
| 2014/0089925 A1* | 3/2014 | Weber | 718/1 |

FOREIGN PATENT DOCUMENTS

| | | | |
|---|---|---|---|
| JP | 2001243080 A | | 9/2001 |
| JP | 2003258795 A | | 9/2003 |
| JP | 2008262419 A | | 10/2008 |
| JP | 2011-242829 | * | 12/2011 |
| JP | 2011242829 A | | 12/2011 |

OTHER PUBLICATIONS

International Search Report and Written Opinion; International Application No. PCT/IB2014/058900; International Filing Date: Feb. 11, 2014; Date of Mailing: Apr. 8, 2014; pp. 1-7.

* cited by examiner

*Primary Examiner* — Sisley Kim
(74) *Attorney, Agent, or Firm* — Cantor Colburn LLP; William A. Kinnaman, Jr.

(57) ABSTRACT

In an exemplary embodiment of this disclosure, a system may include a first hypervisor, a second hypervisor, and a shared memory set. The first hypervisor and the second hypervisor run over a single logical partition. The shared memory set is accessible by both the first hypervisor and the second hypervisor, and the first hypervisor is configured to communicate with the second hypervisor by writing to the shared memory. The second hypervisor may provide support for hardware that is not supported by the first hypervisor, which hardware may be accessed by the first hypervisor through communications facilitated by use of the shared memory.

15 Claims, 4 Drawing Sheets

SYSTEMS AND METHODS TO OFFLOAD HARDWARE SUPPORT USING A HYPERVISOR SUBPARTITION

BACKGROUND

The present disclosure relates to virtual machines and, more particularly, to systems and methods for offloading hardware support by using a hypervisor subpartition on a single logical partition.

Although new hardware is constantly being developed, it may not always be a simple matter to provide support for new hardware to old systems that are used to manage one or more virtual machines. In some cases, a system may include years' worth of upgrades and modifications, which can make adding new hardware support costly as the support may require modifications to numerous system modules that have been added over the years.

SUMMARY

In one embodiment, a system may include a first hypervisor, a second hypervisor, and a shared memory set. The first hypervisor and the second hypervisor run over a single logical partition. The shared memory set is accessible by both the first hypervisor and the second hypervisor, and the first hypervisor is configured to communicate with the second hypervisor by writing to the shared memory. The second hypervisor may provide support for hardware that is not supported by the first hypervisor.

In another embodiment, a computer-implemented method comprises running a first hypervisor over a logical partition, where the first hypervisor comprises a first operating system; and running a second hypervisor over the same logical partition, where the second hypervisor comprises a second operating system. A request may be received at the first hypervisor for a first resource driven by the second hypervisor, and that request may be transmitted from the first hypervisor to the second hypervisor. The request may be performed with a computer processor at the second hypervisor, and the result of the performance may be transmitted from the second hypervisor to the first hypervisor.

In yet another embodiment, a computer program product comprises a computer readable storage medium having computer readable program code embodied thereon. The computer readable program code may be executable by a processor to perform a method. That method may include running a first hypervisor over a logical partition, where the logical partition comprises one or more processors and a set of memory, and where the first hypervisor comprises a first operating system. The method may further include selecting a first subset of the processors and a first subset of the memory, and instructing the first hypervisor to instantiate a second operating system over the first subset of the processors and the first subset of the memory. A second subset of the memory may be shared between the first hypervisor and the second hypervisor.

Additional features and advantages are realized through the techniques of the present disclosure. Other embodiments and aspects of the disclosure are described in detail herein and are considered part of the disclosure. For a better understanding of the various embodiments, along with their advantages and features, refer to the description and to the drawings.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

Figure 1:
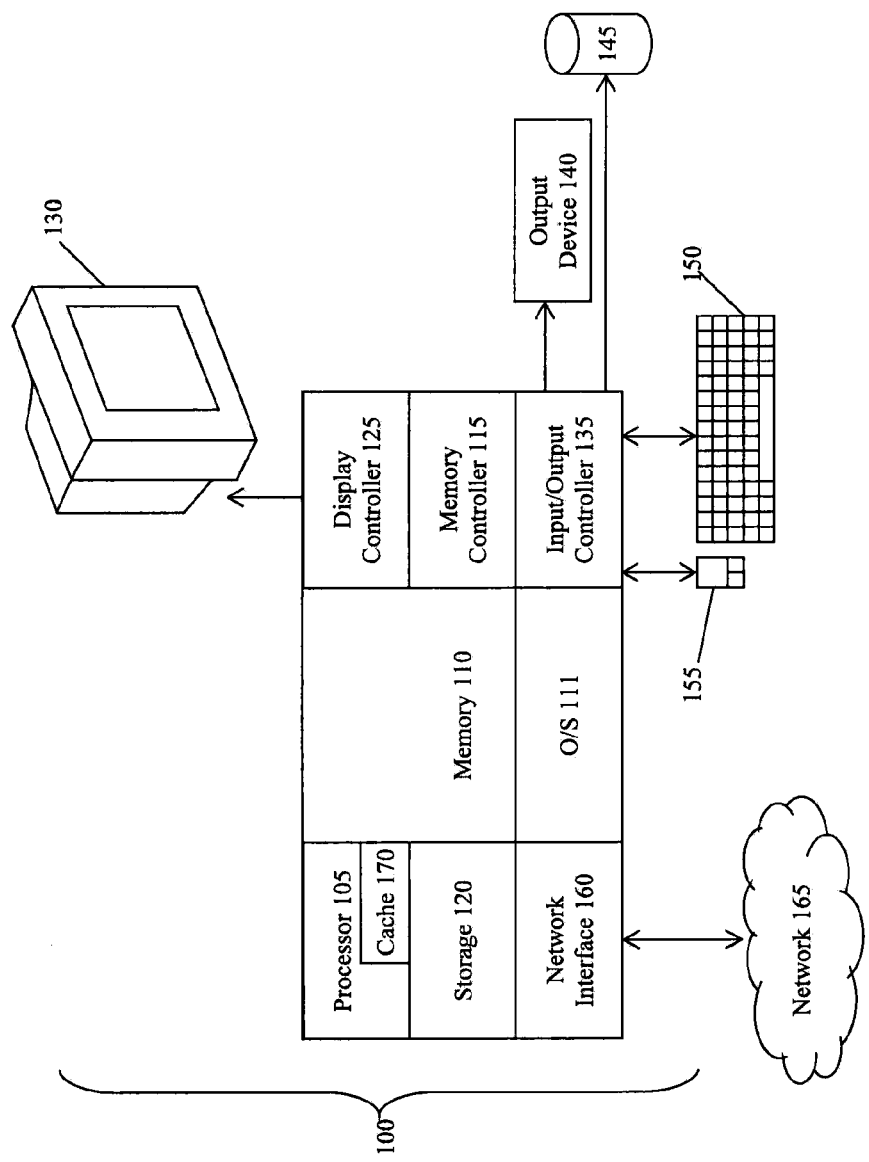
FIG. 1 illustrates a block diagram of a computing device useable with a system according to an exemplary embodiment of this disclosure.

In accordance with exemplary embodiments, two or more hypervisors or operating systems may run in parallel, each in a "subpartition" over a shared logical partition. A first hypervisor running over a logical partition may initialize a second hypervisor by passing the second hypervisor control over a set of memory and a central processing unit (CPU) to which the first hypervisor has access, thus providing the second hypervisor with direct access to the memory and CPU. The first hypervisor may also share another set of memory with the second hypervisor, where the shared memory may be used to pass messages between the hypervisors.

In some embodiments, the first hypervisor may instantiate a different operating system on the second hypervisor than the first operating system running on the first hypervisor. As a result, the second hypervisor and its operating system may provide support for resources, such has hardware drivers, for which the first hypervisor and its operating system do not provide support. Accordingly, the first hypervisor may access these resources through message-passing between the first and second hypervisors.

It will be understood that an operating system according to this disclosure need not run inside a hypervisor. Thus, where this disclosure refers to an operating system running inside a hypervisor, an exemplary embodiment may alternatively use an operating system running directly over a subpartition of a logical partition. Additionally, tasks that are described as being performed by a hypervisor may, in many instances, be performed by an operating system running directly over a subpartition. It will be further understood that an embodiment of this disclosure may include two or more hypervisors, two or more operating systems outside of hypervisors, or a combinations of hypervisors and operating systems.

Embodiments of the present disclosure may address issues that arise when a control program needs to support new hardware or another new resource. In some instances, upgrades to the control program may prove difficult, especially where the control program has already undergone years of upgrades resulting in numerous modules that would need to be modified to provide the new hardware support. Embodiments of this disclosure may provide needed hardware support without costly modification to the control program, by providing a second hypervisor that supports the desired hardware. As a result, hardware support may be offloaded to the second hypervisor. In this manner, overhead may be minimized, parallelism may be maximized, and new hardware may be added with significantly reduced costs.

Embodiments of the present disclosure may also be used for various other purposes, such as for using the second hypervisor to backup data from the first hypervisor; or for implementing security protocols, such as encryption, where the second hypervisor performs secure tasks out of view of the first hypervisor. It will be understood by one skilled in the art that other uses of various embodiments of the disclosure may also exist.

FIG. 1 illustrates a block diagram of a computing device 100 for use in practicing the teachings of this disclosure, according to some embodiments. The methods described in this disclosure may be implemented in hardware, software (e.g., firmware), or a combination thereof. In an exemplary embodiment, the methods described are implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications. Further, the local interface may include address, control, or data connections to enable appropriate communications among these components.

The processor 105 is a hardware device for executing hardware instructions or software, particularly those stored in memory 110. The processor 105 may be any custom made or commercially available processor, a central processing unit (CPU), an auxiliary processor among several processors associated with the computer 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The system 100 may further include a display controller 125 coupled to a display 130. In an exemplary embodiment, the system 100 may further include a network interface 160 for coupling to a network 165. The network 165 may be an IP-based network for communication between the computer 100 and any external server, client and the like via a broadband connection. The network 165 transmits and receives data between the computer 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 2:
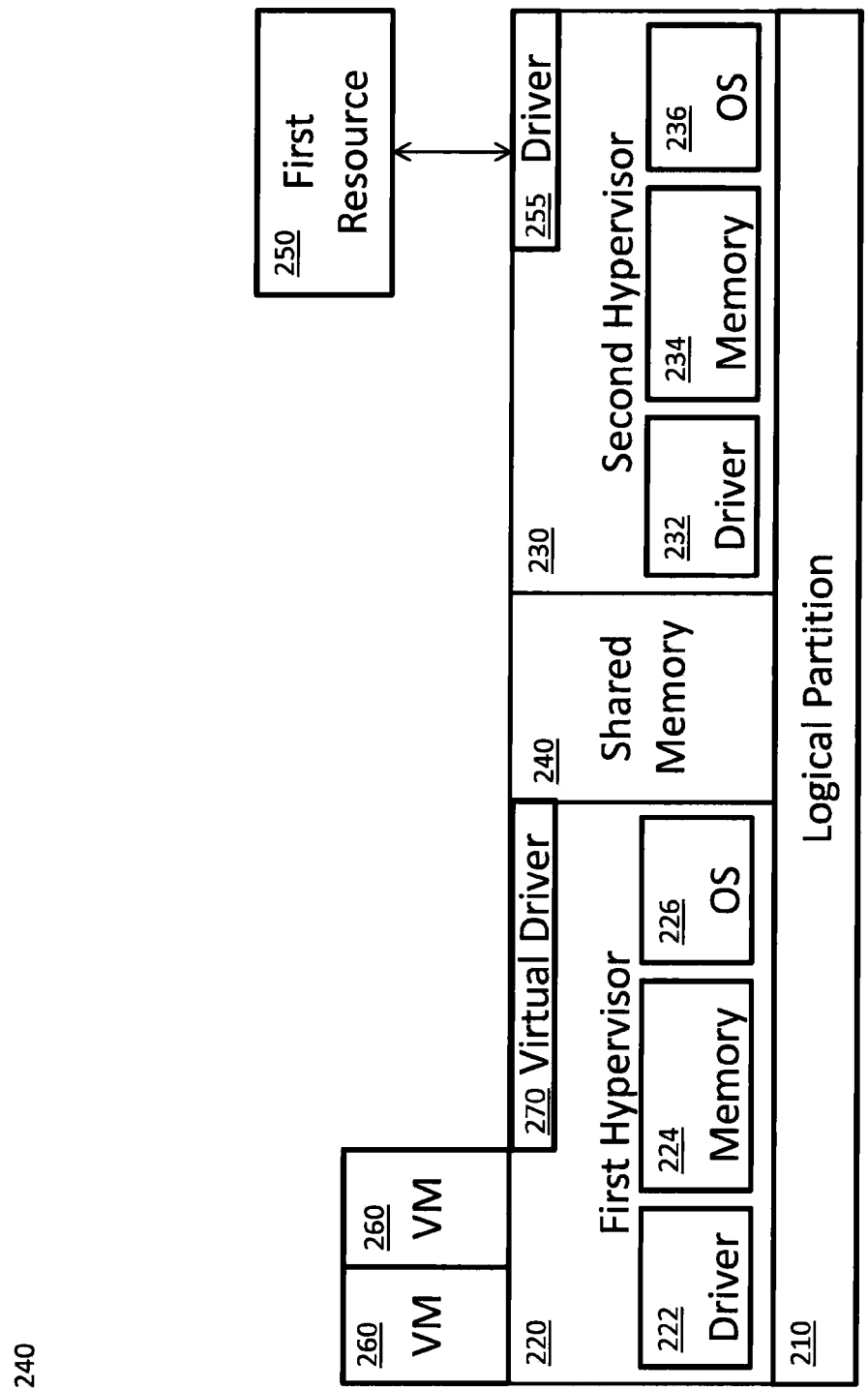
FIG. 2 illustrates a block diagram of a system according to an exemplary embodiment of this disclosure.

FIG. 2 illustrates a schematic diagram of an exemplary embodiment of the disclosed system 200. As shown, the system 200 may include a logical partition 210, first hypervisor 220, a second hypervisor 230, and a shared set of memory 240.

Both the first hypervisor 220 and the second hypervisor 230 may run over the same logical partition 210. The logical partition 210 may represent all or a subset of the hardware existent on a computer system (such as the system 100 shown in FIG. 1), virtualized as a distinct computer. The logical partition 210 may provide one or more processors and a set of memory to the hypervisors 220 and 230.

Conventionally, no more than a single hypervisor runs over a logical partition. The hypervisor accesses the hardware of the host computer system through the logical partition. As such, the hypervisor can host one or more guest virtual machines, which each behave as if they have their own hardware. Embodiments of the present disclosure, however, may provide multiple hypervisors running over a single logical partition.

According to the present disclosure, a first hypervisor 220 and a second hypervisor 230 may both run over the same logical partition 210. As described further below, despite sharing the logical partition 210, the first hypervisor may have its own one or more processors 222, memory 224, and first operating system 226. The second hypervisor may likewise have its own processors 232, memory 234, and second operating system 236.

In an exemplary embodiment, the first operating system 226 and the second operating system 236 may be different operating systems. For example, and not limitation, the first operating system 226 may be a version of Windows® while second operating system may be a version of Linux®. Because of the open source nature of Linux, new hardware support may become available quickly and at little cost to the system administrator through the Open Source Community, making this operating system a beneficial choice in some embodiments. It will be understood, however, that other operating systems may be used in addition, or alternatively, to Windows and Linux.

The first hypervisor 220 may have one or more virtual machines (VMs) 260 running on top of it. The virtual machines 260 or the first hypervisor 220 itself may desire access to resources not supported by the first operating system 226, such as the first resource 250 in FIG. 2. In this case, however, such resource may be supported by the second operating system 236, which may include driver 255 for driving the resource 250. The resources may include hardware resources, where the first operating system is unable to support the appropriate drivers, e.g., printer driver, small computer system interface (SCSI) drivers, or flash drivers.

In some instances, the second operating system 236 may support resources that are not supported by the first operating system 226. In fact, in some exemplary embodiments, the second hypervisor 230 may be initialized and its operating system 236 chosen specifically to support resources that are unsupported by the first operating system 226. In that case, the first hypervisor 220 may access resources its operating system 226 does not support by passing messages to the second operating system 236, which does support such resources.

Communications between the first and second hypervisors 220 and 230, and their respective operating systems 226 and 236, may occur through he shared memory 240. As discussed above, each hypervisor 220 and 230 may have access to its own memory 224 and 234. Data placed by the first hypervisor in the first memory 224 may be inaccessible to, or not accessed by, the second hypervisor 230. Likewise, data placed by the second hypervisor in the second memory may be inaccessible to, or not accessed by, the first hypervisor. Data in the shared memory 240, however, may be accessible by both the hypervisors 220 and 230. Thus, the first hypervisor 220 may communicate with the second hypervisor by writing data to the shared memory 240, and likewise, the second hypervisor may communicate with the first hypervisor by writing data to the shared memory 240.

In an exemplary embodiment, there may exist a first resource 250 supported by the second operating system 236 and not the first operating system 226. The first hypervisor 220 may access the first resource 250 by writing a request for the first resource 250 into the shared memory 240. The request may have been initiated by one of the virtual machines 260, or by the first hypervisor 220 itself. The second hypervisor 230 may service the request by accessing the first resource 250 and may then return the result of such access to the shared memory 240, where that result may be retrieved by the first hypervisor 220. The result may be, for example, a confirmation that the request was performed successfully, an error message, or a data output received from the first resource 250.

Each hypervisor 220 and 230 may be configured to drive its respective input and output devices, or other resources. Each hypervisor 220 and 230 may also be configured to handle interrupts within its respective domain. For example, the first hypervisor 220 may generally intercept input-output requests of its virtual machines 260. If such a request is intercepted and deemed to refer to a resource of the second hypervisor 230, such as the first resource 250, the first hypervisor 220 may forward the request to the second hypervisor 230 for handling, out of view of the requesting virtual machine 260.

In some embodiments, the first operating system 226 and the second operating system need not be aware of each other.

The first operating system 226 may access a virtual driver for the first resource 250. When the first hypervisor 220 captures an event related to the virtual driver 270, the first hypervisor 220 may then transmit a request, through the shared memory 240, for the first resource 250. In turn, the second operating system 236 may access the request from the shared memory 240, perform the request using the first resource 250, and then transmit the result back to the first hypervisor 220 through he shared memory 240. The first hypervisor 220 may then deliver the result to the first operating system 226, as if the result comes from the virtual driver 270.

Figure 3:
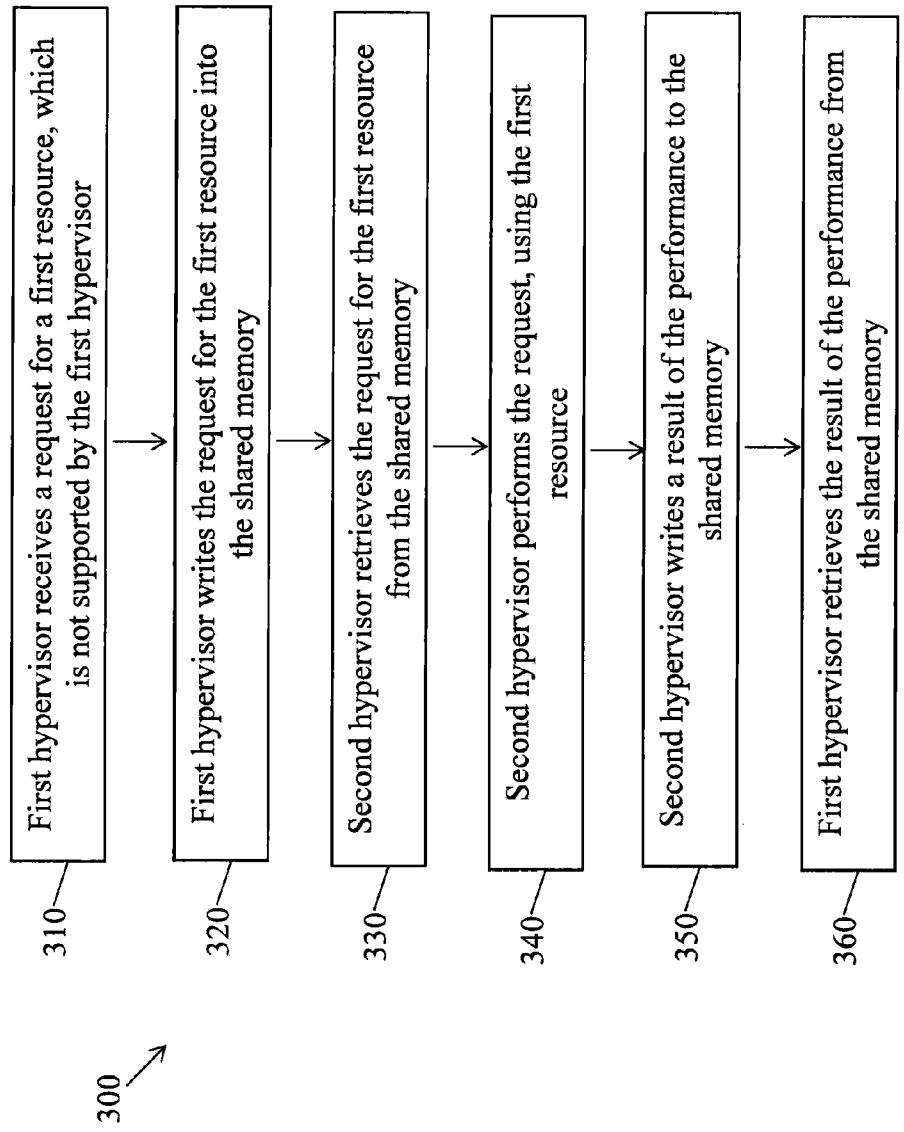
FIG. 3 illustrates a flow diagram of a method for handling a request for a resource, according to an exemplary embodiment of this disclosure.

FIG. 3 illustrates a flow diagram of a method 300 for accessing a resource unsupported by the first operating system 226, according to an exemplary embodiment of this disclosure. At 310, a request for a first resource 250 is received at the first hypervisor 220. At 320, the first hypervisor 220 writes the request for the first resource 250 into the shared memory 240. At 330, the second hypervisor 230 retrieves the request from the shared memory 240. At 340, the second hypervisor 230 performs the request on the first resource 250. At 350, the second hypervisor 230 writes a result of the performance to the shared memory 240. At 360, the first hypervisor 220 retrieves the result of the performance from the shared memory 240.

In some embodiments, for example, the first hypervisor 220 may begin running over the logical partition 210 prior to the creation of the second hypervisor 230 and may have access to the logical partition's processors and memory. The first hypervisor 220 may also be associated with an operating system 222. The first hypervisor 220 may initialize the second hypervisor 230 may by instantiating a second operating system 236 over a subset of the processors and memory currently allotted to the first hypervisor 220. The first hypervisor 220 may thus provide the second hypervisor 230 with a subset of the first hypervisor's processors and memory, which may become the second hypervisors processors 232 and memory 234, which the first hypervisor 220 may then cease to access directly.

Figure 4:
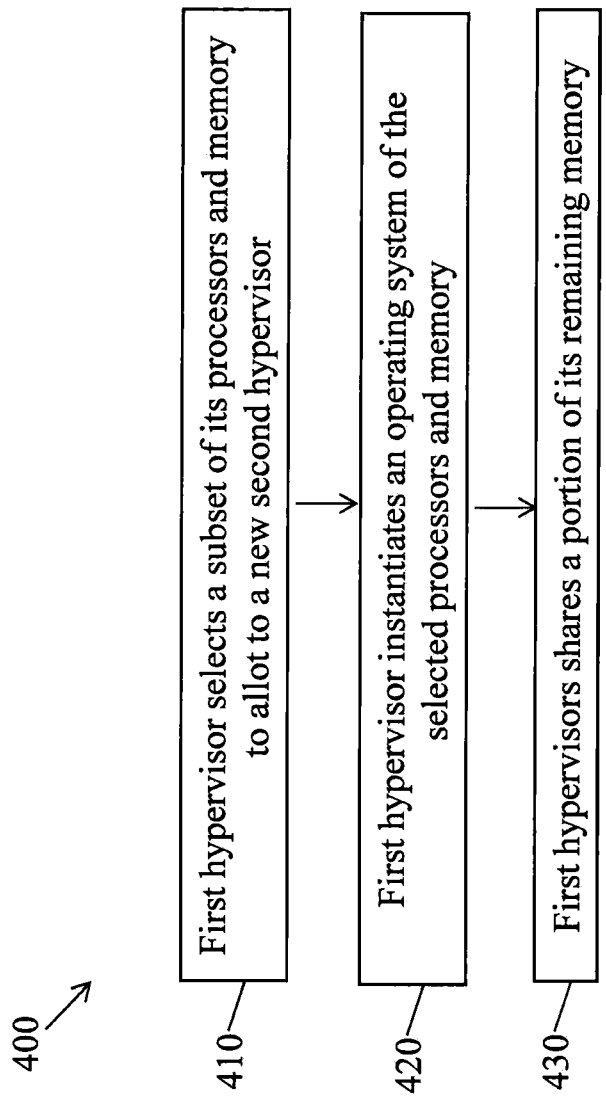
FIG. 4 illustrates a flow diagram of a method for initializing a second hypervisor, according to an exemplary embodiment of this disclosure.

FIG. 4 illustrates a flow diagram of a method 400 for initializing the second hypervisor 230, according to some exemplary embodiments. At 410, the first hypervisor selects a subset of its processor and memory for use by the second hypervisor 230. At 420, the first hypervisor 220 initializes the second hypervisor 230 by instantiating the second operating system 236 over the selected subset of processors and memory, which become the second processor 232 and the second memory 234. At 430, the first hypervisor 220 shares a portion of its remaining memory with the second hypervisor 230, which portion becomes the shared memory 240.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method comprising:
   running a first operating system over a first hypervisor operating through a first logical partition;
   allocating to a second operating system a subset of resources of the first operating system, wherein the first operating system ceases to access the subset of resources directly;

running the second operating system over a second hypervisor operating through the first logical partition, wherein the first hypervisor and the second hypervisor both operate through a single and shared logical partition, being the first logical partition, wherein two or more hypervisors operate through the first logical partition;

receiving at the first operating system a request for a first resource not supported by the first operating system;

transmitting from the first operating system to the second operating system the request for the first resource;

performing, with a computer processor, the request at the second operating system; and transmitting a result of the request from the second operating system to the first operating system.

2. The method of claim 1, further comprising sharing a shared memory between the first operating system over the first hypervisor and the second operating system over the second hypervisor, wherein transmitting from the first operating system to the second operating system the request for the first resource comprises writing the request into the shared memory.

3. The method of claim 1, wherein the first operating system is configured to drive only a first set of resources, and the second operating system is configured to drive a second set of resources, and wherein the first resource belongs to the second set of resources and is excluded from the first set of resources.

4. The method of claim 3, wherein the first operating system comprises a virtual driver associated with the first resource.

5. The method of claim 1, wherein receiving at the first operating system the request for the first resource driven by the second operating system comprises receiving the request from a virtual machine running on the first operating system.

6. A system comprising: one or more computer processors for executing computer readable instructions, the computer readable instructions comprising:

running a first operating system over a first hypervisor operating through a first logical partition;

allocate to a second operating system a subset of resources of the first operating system, wherein the first operating system ceases to access the subset of resources directly;

running the second operating system over a second hypervisor operating through the first logical partition, wherein the first hypervisor and the second hypervisor both operate through a single and shared logical partition, being the first logical partition, wherein two or more hypervisors operate through the first logical partition;

receiving at the first operating system a request for a first resource not supported by the first operating system;

transmitting from the first operating system to the second operating system the request for the first resource;

performing, with a computer processor, the request at the second operating system; and transmitting a result of the request from the second operating system to the first operating system.

7. The system of claim 6, the computer readable instructions further comprising sharing a shared memory between the first operating system over the first hypervisor and the second operating system over the second hypervisor, wherein transmitting from the first operatinng system to the second operating system the request for the first resource comprises writing the request into the shared memory.

8. The system of claim 6, the computer readable instructions further comprising running a virtual machine on the first hypervisor, wherein a request from the virtual machine for the first resource is transmitted from the first hypervisor to the second hypervisor.

9. The system of claim 7, wherein the first operating system and second operating system are different operating systems providing different hardware support.

10. A computer program product comprising a non-transitory computer readable storage medium having computer readable program code embodied thereon, the computer readable program code executable by a processor to perform a method comprising:

running a first operating system over a first hypervisor operating through a first logical partition;

allocating to a second operating system a subset of resources of the first operating system, wherein the first operating system ceases to access the subset of resources directly;

running the second operating system over a second hypervisor operating through the first logical partition, wherein the first hypervisor and the second hypervisor both operate through a single and shared logical partition, being the first logical partition, wherein two or more hypervisors operate through the first logical partition;

receiving at the first operating system a request for a first resource not supported by the first operating system;

transmitting from the first operating system to the second operating system the request for the first resource;

performing, with a computer processor, the request at the second operating system; and transmitting a result of the request from the second operating system to the first operating system.

11. The computer program product of claim 10, the method further comprising:

providing on the second hypervisor a first driver for a first hardware device, where in the first hypervisor is configured to access the first hardware device through a request to the second hypervisor.

12. The computer program product of claim 11, wherein the request to the second hypervisor is made through the second subset of memory.

13. The computer program product of claim 11, the method further comprising providing a virtual driver on the first hypervisor for controlling the first hardware device.

14. The computer program product of claim 13, further comprising:

running a virtual machine on the first hypervisor;

receiving an indication that the virtual machine is accessing the virtual driver; and transmitting from the first hypervisor to the second hypervisor a request for the first hardware device in response to the virtual machine's access to the virtual driver.

15. The computer program product of claim 11, the method further comprising:

supporting one or more virtual machines on the first hypervisor; and providing the one or more virtual machines access to the first hardware device through communications between the first hypervisor and the second hypervisor.

* * * * *